United States Patent
Shankar et al.

(10) Patent No.: US 8,584,248 B2
(45) Date of Patent: Nov. 12, 2013

(54) TRANSFORMING UNTRUSTED APPLICATIONS INTO TRUSTED EXECUTABLES THROUGH STATIC PREVIRTUALIZATION

(75) Inventors: Natarajan Shankar, Los Altos, CA (US); Richard Drews Dean, Arlington, VA (US)

(73) Assignee: SRI International, Menlo Park, CA (US)

( * ) Notice: Subject to any disclaimer, the term of this patent is extended or adjusted under 35 U.S.C. 154(b) by 90 days.

(21) Appl. No.: 13/282,114

(22) Filed: Oct. 26, 2011

(65) Prior Publication Data

US 2013/0111593 A1    May 2, 2013

(51) Int. Cl.
- *G06F 11/00* (2006.01)
- *G06F 12/14* (2006.01)
- *G06F 12/16* (2006.01)
- *G08B 23/00* (2006.01)

(52) U.S. Cl.
USPC .......................................................... 726/25

(58) Field of Classification Search
USPC .......................................................... 726/25
See application file for complete search history.

(56) References Cited

U.S. PATENT DOCUMENTS 8,290,763 B1 * 10/2012 Zhang .............................. 703/26

OTHER PUBLICATIONS

Pre-Virtualization: Slashing the Cost of Virtualization, LeVasseur, Uhlig, Chapman, Chubb, Lesli, Heiser. Technical Report Nov. 2005.*
Technical Report: Interpretational overhead in system software, Boris Feigin. Apr. 2011.*
Le Vasseur, Joshua, et al., "Pre-Virtualization: Slashing the Cost of Virtualization," Technical Report Nov. 30, 2005, Fakultät für Informatik, Universität Karlsruhe (TH), pp. 1-14.
Erlingsson, Úlfar, et al., "IRM Enforcement of Java Stack Inspection," in Proceedings IEEE Symposium on Security and Privacy, (Oakland, California, May 2000), IEEE Computer Society, California, pp. 1-27.
Sandrini, Raffaele, "VMkit a lightweight hypervisor library for Barrelfish," Masters Thesis, ETH Zurich, Systems Group, Department of Computer Science, 8092 Zurich, Switzerland, Sep. 2, 2009, pp. 1-51.

* cited by examiner

*Primary Examiner* — Edan Orgad
*Assistant Examiner* — Harris Wang

(57) ABSTRACT

A method for transforming untrusted applications into trusted executables through static previrtualization is disclosed. For example, the method receives an untrusted application and extracts a system call from the untrusted application. The method then determines if the system call is privileged or non-privileged. If the system call is privileged, the method replaces the system call with a hypercall. If the system call is non-privileged, it is replaced with a library call. The method repeats this process for additional system calls in the untrusted application to create a trusted executable. The method then forwards the trusted executable.

20 Claims, 4 Drawing Sheets

TRANSFORMING UNTRUSTED APPLICATIONS INTO TRUSTED EXECUTABLES THROUGH STATIC PREVIRTUALIZATION

The present disclosure relates generally to computer executable applications and, more particularly, to a method and apparatus for transforming untrusted applications into trusted executables through static previrtualization.

BACKGROUND

Systems often receive software applications that come from untrusted sources. Such systems would like to know or guarantee that such applications will do no harm to the system if and when installed. One approach involves the use of proof carrying code (PCC) whereby an application provider produces a proof that the application does no harm and conforms to the security policies of a system. The proof is then checked by a trusted third party. A similar approach involves including a type guarantee in the application which is then checked by a trusted third party.

The concept of virtualization, as applied to computer systems and data networks, provides an abstract view of hardware and operating system resources. Virtualization allows multiple computing channels to access shared resources while providing an illusion of exclusivity. With the proliferation of data centers and cloud computing, virtualization is used to execute multiple independent programs on shared servers. Virtualization can be used to run guest operating systems on host ones, to isolate processes or to make applications portable, for platform emulation, and to aid in debugging. Virtualization can also be used to ensure security by restricting the privileges associated with a specific host partition. Although the above arrangements achieve several noteworthy objectives, and are suitable for use in various computer and network designs, such arrangements still leave many vulnerabilities and inefficiencies in place that threaten the security and speed of a host system. In addition, these techniques may still allow applications to access unauthorized data and to perform unauthorized device operations when running on a host system.

SUMMARY

In one embodiment, the present disclosure discloses a method for transforming untrusted applications into trusted executables through static previrtualization. For example, the method receives an untrusted application and extracts a system call from the untrusted application. The method then determines if the system call is privileged or non-privileged. If the system call is privileged, the method replaces the system call with a hypercall. If the system call is non-privileged, it is replaced with a library call. The method repeats this process for additional system calls in the untrusted application to create a trusted executable. The method then forwards the trusted executable.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method for transforming untrusted applications into trusted executables through static previrtualization. In particular, static previrtualization transforms an untrusted application into a trusted executable that is secure, portable, self-contained, and well-behaved. Notably, a system that receives and deploys a trusted executable created through static previrutalization is guaranteed that the running program will do no harm when accessing and interacting with the system. Although the process of static virtualization is discussed below in the context of an exemplary system and communication network, the present disclosure is not so limited. Namely, the present disclosure can be applied to other types of networks and systems, wherein static previrtualization of an untrusted application may be achieved.

Figure 1:
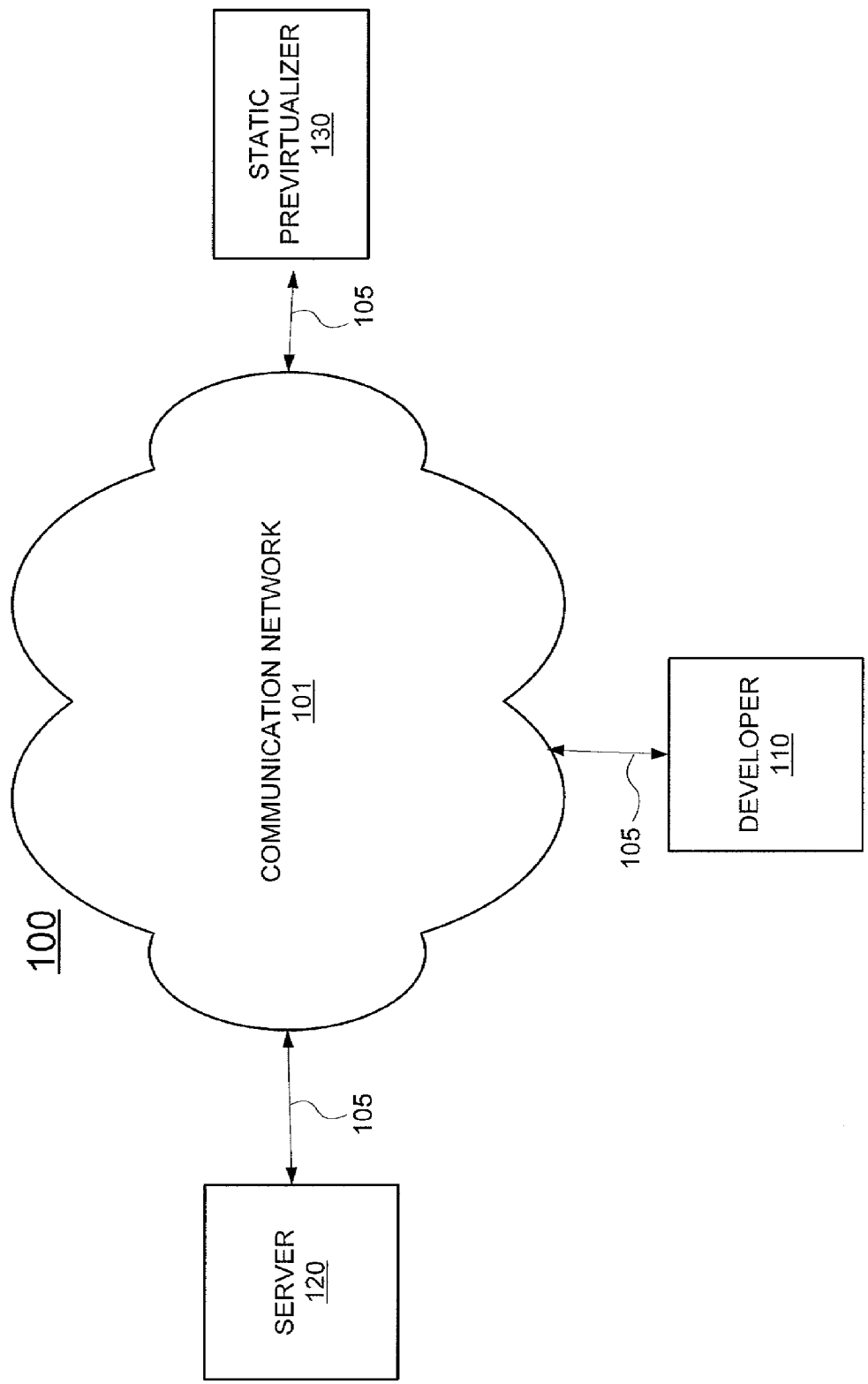
FIG. 1 illustrates an exemplary system related to the present disclosure.

To better understand the present disclosure, FIG. 1 illustrates an example system 100, related to the present disclosure. In particular, system 100 includes communication network 101, developer 110, server 120 and static previrtualizer 130, suitable for transforming untrusted applications into trusted executables through static previrtualization. In one embodiment, the communication network 101 comprises a packet network, such as an internet protocol (IP) network, asynchronous transfer mode (ATM) network, frame-relay network, and the like. An IP network is broadly defined as a network that uses Internet Protocol to exchange data packets. In one embodiment, communication network 101 comprises the Internet. In another embodiment, communication network 101 comprises a local area network (LAN) or intranet. Broadly, the communication network 101 comprises any physical medium (as well as wireless arrangements) capable of intraconnecting developer 110, server 120 and static previrtualizer 130, and other devices, for purposes of data communication.

In one embodiment, each of the developer 110, server 120 and static previrtualizer 130 comprises a general purpose computer configured to perform one or more of the particular functions described herein. An exemplary general purpose computer in which all or a portion of the respective functions may be performed is described below in connection with FIG. 4. In one embodiment, developer 110 comprises a workstation where various applications may be developed, e.g., by a programmer. For example, developer 110 may be a workstation comprising a general purpose computer suitable for programming, creating, debugging, installing and running various applications. Similarly, server 120 may comprise a server configured to install and run various applications. For example, server 120 may comprise a web-server or a web-hosting server, a file-transfer protocol server, a firewall device, a switch, a router, a media server, and the like that is suitable for installing, running and hosting various applications. In addition, static previrtualizer 130 may comprise a computer, a server, or similar device configured to perform the various functions described below in connection with the exemplary method 300.

In the example of FIG. 1, each of the developer 110, server 120 and static previrtualizer 130 is coupled to the communication network 101 through links 105. Although each of the links 105 is shown as a single bidirectional link between a respective device and communication network 101, this is merely a logical depiction. For example, any of links 105 may comprise multiple physical links, wireless channels, and intermediate devices, such as a number of routers, switches, and the like. In addition, one or more intermediary networks may be traversed by each of the links 105 in connecting the respective devices to the communication network 101. For example, link 105 connecting developer 110 to the communication network 101 may traverse a local area network (LAN) and/or an access network (e.g., any packet switched network, circuit switched network, an internet service provider network, a wireless local area network (WLAN), a cellular network, and the like). Furthermore, although developer 110, server 120 and static previrtualizer 130 are shown as being connected to communication network 101, and are described as accessing communication network 101 via links 105 and/or any number of intermediate networks, it should be understood that any one or more of developer 110, server 120 and static previrtualizer 130 may be deployed within, or comprise a component of communication network 101. For example, if communication network 101 is a large corporate LAN, server 120 may comprise a database server or other application server accessible to corporate users, e.g., via developer 110, which may comprise a workstation attached to the corporate LAN. Similarly, although only a single developer, server and static previrtualizer are shown, additional embodiments contemplated by the disclosure include configurations having multiple developers submitting untrusted applications to various static previrtualizers to be run on various servers. Furthermore, although the static previrtualizer 130, server 120 and developer 110 are shown as unique devices, in various embodiments, any one or more of these devices may be integrated within a single device. As just one example, the functionality of the static previrtualizer 130 may reside on the developer 110 and/or server 120. Similarly, the developer 110 and server 120 may co-exist on the same device. Furthermore, each of the static previrtualizer 130, developer 110 and server 120 may comprise multiple devices. For instance, the server 120 may actually comprise a grouping of physically distinct servers that logically function as a single server 120. Similarly, developer 110 may comprise a cluster of co-located computers, workstations, smart phones, cellular phones, personal digital assistants, mobile communication devices, and the like, or even a group distributed devices. Additional details and variations of this nature are omitted for simplicity and to improve clarity of understanding with respect to the claimed embodiments. Broadly, the present disclosure may include any other, further or different network configuration that is suitable for transforming untrusted applications into trusted executable through static previrtualization. Thus, for the purposes of the following discussion, it is assumed that the described embodiments are implemented within the exemplary system 100 depicted in FIG. 1.

Figure 2:
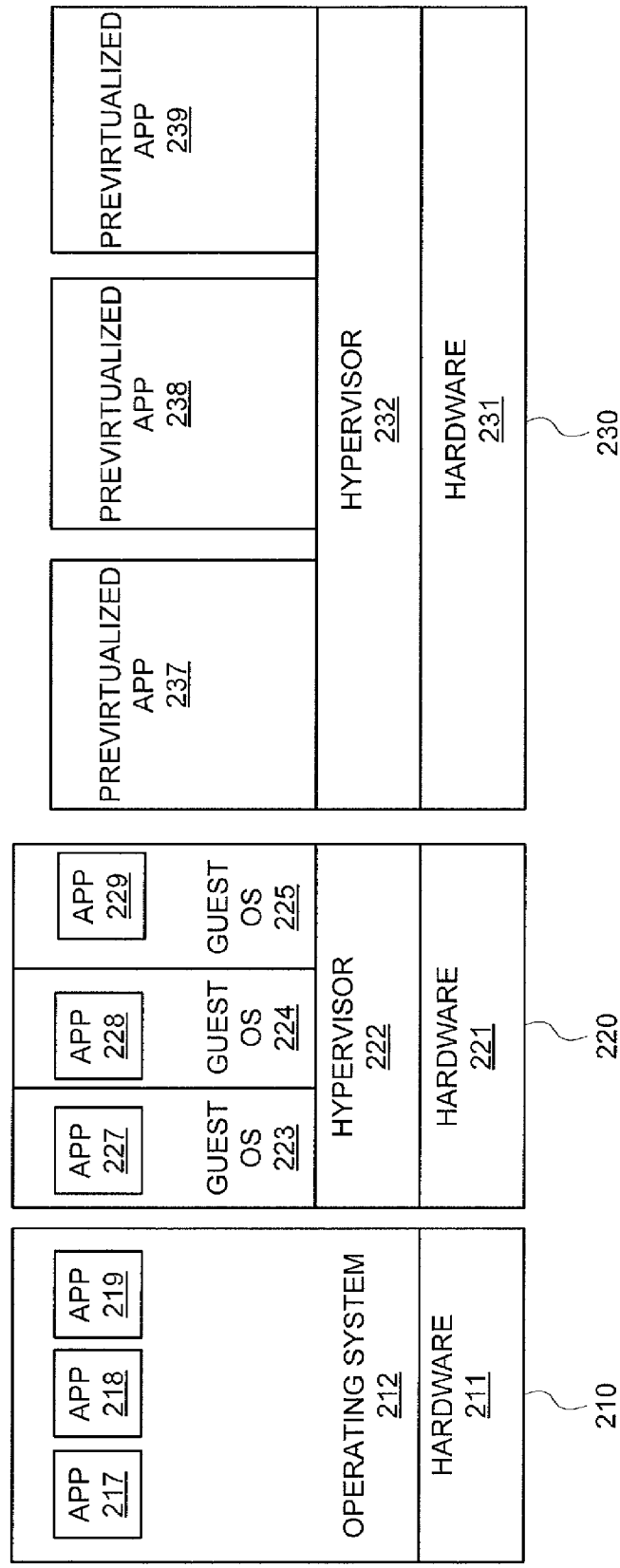
FIG. 2 illustrates several hardware, operating system and application software arrangements in accordance with various embodiments.

FIG. 2 depicts several arrangements for providing application access to hardware resources. The latter two arrangements employ several instances of virtualization, as will be described in further detail below. Arrangement 210 may comprise a typical computer having a hardware resource 211. Although referred to in the singular, it should be understood that the terms "hardware" and "hardware resource" may be used herein to refer to a single piece of hardware (such as a disk drive, a processor, a memory device, and the like) or several pieces of hardware (such as a CPU, a display, a memory, input and output devices, and the like), which may operate together to collectively comprise a hardware resource. An operating system 212 may be loaded on the hardware 211 (e.g., in a memory) and provide an interface for user access to the hardware. In addition, the operating system 212 may be configured to allow one or more applications 217-219 to run in the user space and access the hardware via the operating system. Note that arrangement 210 does not employ any aspects of virtualization. In contrast, arrangement 220 may, in one embodiment, depict a common virtualization architecture involving a hardware resource that is to be shared among a number of virtual machines. Typically, a virtual machine monitor (VMM), also known as a hypervisor, runs directly on the hardware. In turn, one or more virtual machines may be implemented via the hypervisor. In arrangement 220, a hypervisor 222 is shown running on top of the hardware 221. Each of the virtual machines may run its own operating system, which may include diverse operating system types. For example, in arrangement 220, a number of guest operating systems 223-225 (e.g., virtual machines) run atop the hypervisor 222. Each of the guest operating systems 223-225 may be configured to allow respective applications 227-229 to run in the respective user spaces of the operating systems. In general, the hypervisor 222 manages the underlying hardware resource 221 and provides an abstraction of the underlying hardware resource 221 to the various guest operating systems 223-225 running on top of the hypervisor.

In the above described embodiment, the arrangement 220 may be considered an instance of "full virtualization" that allows one or more guest operating systems (and applications executed via a particular guest operating system) to run without modification. In other words, the hypervisor fully emulates the underlying hardware. In this case, system calls from the operating system are trapped by the hypervisor and processed as hypercalls. The guest operating system may be unaware that its system calls are being received and processed, or "trapped", by another software layer (i.e., the hypervisor). Broadly, a hypercall is an invocation of a software resource available in the hypervisor. For example, a hypercall may invoke a device driver that exists in the hypervisor. When a virtual machine is aware that it is running atop a hypervisor, explicit hypercalls by the virtual machine to the hypervisor may be considered analogous to an application making a system call to the host operating system kernel.

Partial evaluation is an optimization technique that specializes a piece of code relative to some fixed parameter values. For example, specializing an interpreter to a specific input program yields the target code for the program. Partial evaluation has been used in the area of virtualization to optimize a guest operating system based on commonly used system call invocations, and has sometimes been referred to as "previrtualization." In one technique, the assembler code of a guest operating system is rewritten to replace the privileged instructions and instruction blocks in the guest operating system with emulation code. In this way, by specializing the guest operating system with respect to a given set of applications intended to run on a given hardware configuration, only those features essential for the particular applications being deployed on a particular set of machines need remain in the guest operating system. In other words, partial evaluation of an operating system can trim device drivers and other kernel modules down to the exact minimum required to support the application(s) on the given hardware and provide a specialized operating system. Thus, in order to work in an optimal manner, pre-virtualization requires prior knowledge of how the operating system/virtual machine will be used (i.e., which applications it is intended to run) and on what hardware the operating system/virtual machine will be installed.

In another embodiment, arrangement 220 may depict a system incorporating the above described principles of pre-virtualization. For instance, each of the guest operating systems 223-225 may be pre-virtualized by stripping the respective kernels of the operating systems of unnecessary features. For instance, drivers for hardware that does not exist will not be used and system calls that are not anticipated to be invoked by the applications that will be deployed via an operating system are removed from the kernel code. For example, if hardware 221 does not include speakers, audio drivers may be removed from the respective kernels of guest operating systems 223-225. As another example, a single driver may support several similar devices (e.g., a family of devices from the same manufacturer), but the system may only employ one of the devices. Thus, in one embodiment, partial evaluation may be used to trim the driver down to only those portions necessary to support the one device. As such, the applications running via such operating system cannot invoke such removed features (nor should such applications be invoking these features, if operating properly).

Such a specialized operating system can either run on bare hardware (e.g., guest operating systems 223-225 running directly atop hardware 221) or under a virtual machine hypervisor (e.g., guest operating systems 223-225 running atop hypervisor 222. In the latter case, it makes sense for each of the specialized operating systems 223-225 not to contain its own concrete device drivers, but rather interfaces to drivers in the hypervisor 222. This is often referred to as paravirtualization. Paravirtualization incorporates pre-virtualization of a guest operating system with further modifications to the guest operating system. Broadly, paravirtualization requires the guest operating system to be ported (i.e., modified) to explicitly invoke hypercalls to the hypervisor in order to avoid the inefficiency associated with hypervisor processing traps. This requires that the operating system be "aware" that it is running atop a hypervisor. Examples of paravirtualization include the Xen and Denali hypervisors, which both require that the supervisor and hypervisor calls be optimized using partial evaluation.

Although the above arrangements achieve several noteworthy objectives, and are suitable for use in various computer and network designs, an unmodified application deployed via a pre-virtualized or paravirtualized guest operating system still leaves many vulnerabilities and inefficiencies in place that threaten the security and speed of the host system. A typical operating system includes a vastly greater number of drivers, system calls and other resources than a general application will ever need. In fact, the practical application that uses every single system call of an operating system is quite rare. Furthermore, almost all programs (including interpreters and runtime systems for compiled languages) bound their system call set via their source or object code. The principle of least privilege implies that a program should not be able to make a system call that it provably will never make in an execution that conforms to its object or source code. The Wagner/Dean model for intrusion detection (see, e.g., D. Wagner and D. Dean, *Intrusion Detection via Static Analysis,* Proceedings of the 2001 IEEE Symposium on Security and Privacy, 2001) makes this practical: an operating system can trivially have its system call table populated with only the needed system calls for the applications it runs.

Previrtualizing an operating system (including paravirtualization, as described above) addresses these vulnerabilities to a limited extent. However, these approaches focus primarily upon system efficiency: by removing extraneous code and avoiding hypervisor traps by explicitly invoking hypercalls, a system avoids extraneous computations, and therefore runs faster. Added security is a byproduct: by eliminating unnecessary resources from the operating system, less resources are available to be invoked by a malicious application. However, even in a previrtualized operating system, if the specialized (i.e., previrtualized) operating system is designed to support a handful of applications, any one of those applications, when installed, may be corrupted to make system calls or invoke drivers that would not normally be invoked by the application, if running properly. For instance, a specialized operating system may include an audio driver which may be invoked in normal operations by application A. On the other hand, application B may comprise an application that has no need for any audio support. Notably, application B may still be modified or corrupted to make calls to the audio driver. The specialized operating system cannot be guaranteed to prevent such undesireable behavior.

A variety of other virtualization techniques are also being used, such as application virtualization, as performed by VMWare's ThinApp. ThinApp allows applications to be executed without actually being installed on the machine. In another example, sandboxing can be used to execute an application in isolation. In addition, live discs (e.g., a live compact disc (CD)) can be loaded to execute on a machine without affecting the state of the machine. Similarly, software appliances are essentially self-contained executables for specific applications like web servers or wikis. However, these techniques for creating software appliances and virtualized applications do not provide the capability to restrict the privileges of the application to guarantee an executable that can be trusted not to access unauthorized data and not to perform unauthorized device operations.

In contrast with the above, the present disclosure describes a novel process for static previrtualization of an application. In static previrtualization, partial evaluation is used to specialize a software application with respect to the guest operating system calls that actually occur in the form of privileged instructions or supervisor and hypervisor calls. In particular, partial evaluation is applied to the system calls within a software application to produce a scaled-down, previrtualized version of the application. Through this form of previrtualization, which we call static previrtualization, the application is packaged in a form that is compact, efficient, portable, operating system platform independent, and securely isolated from other computing channels. Static previrtualization is analogous to a live compact disc (CD) distribution of an application, but without the burden of redundant software or the need to be boot loaded. This means that previrtualized software can be run in a user space within a guest operating system, on bare hardware, or within a separate partition over a hypervisor. Static previrtualization is thus a simple, safe, and effective method of distributing applications so that they are isolated, compact, self-contained, and stable. In addition, a trusted previrtualizer implementing such a static previrtualization process produces highly assured applications for a range of platforms and can even provide services to a number of unrelated entities.

Arrangement 230 in FIG. 2 shows a number of previrtualized applications 237-239 running on hardware 231 via hypervisor 232. Notably, each of the previrtualized applications 237-239 is isolated from the other previrtualized applications and may be previrtualized to run atop hypervisor 232.

In another embodiment, any one or more of the previrtualized applications 237-239 may be previrtualized to run directly atop hardware 231 or even to operate within the user space of a guest operating system. The process of static previrtualization to create a trusted executable is described in greater detail below in connection with the exemplary method 300.

Figure 3:
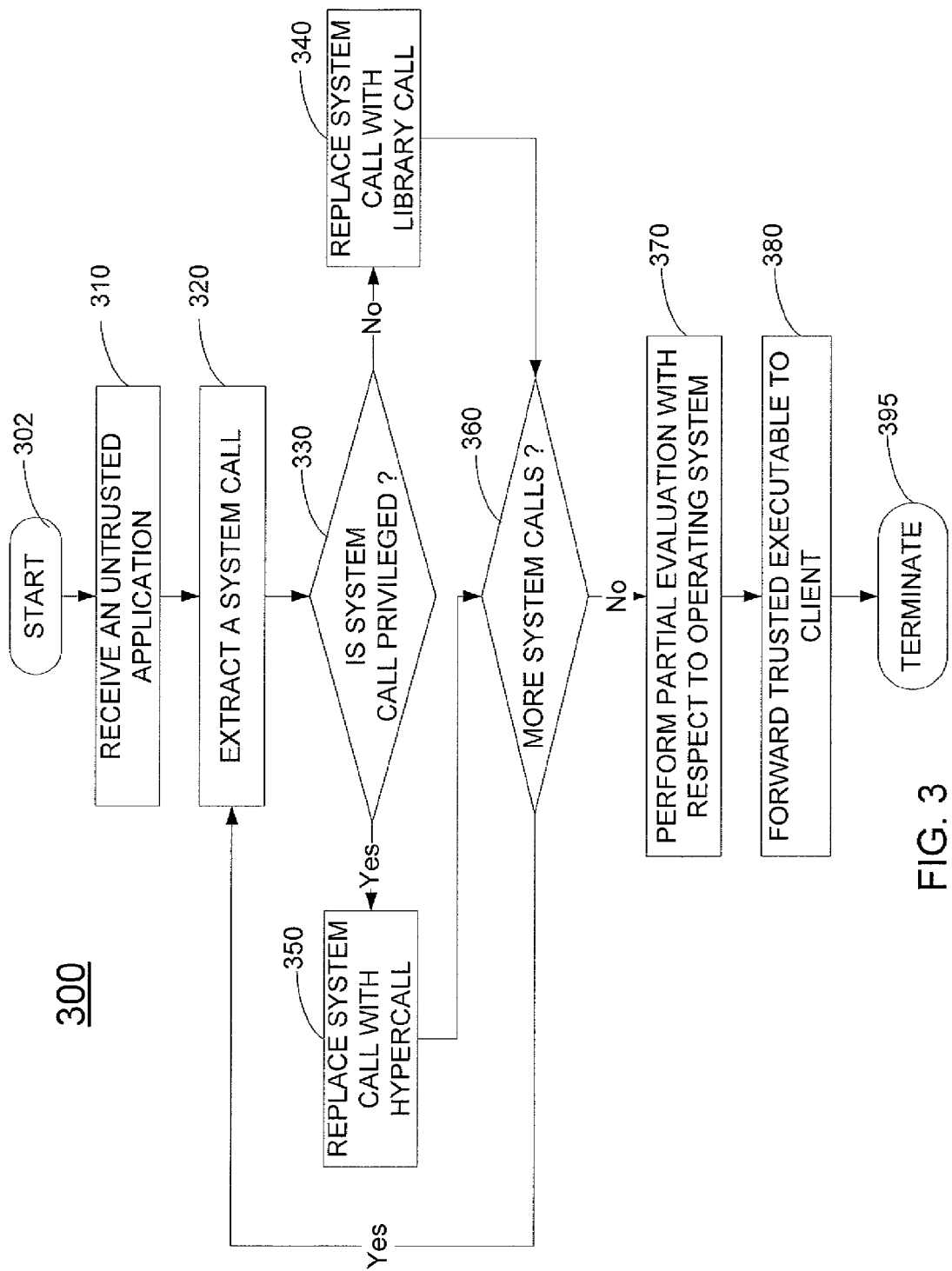
FIG. 3 illustrates a flowchart of a method for transforming an untrusted application into a trusted executable through static previrtualization.

FIG. 3 illustrates a flowchart of a method 300 for transforming an untrusted application into a trusted executable through static previrtualization. The steps of the method 300 may be performed by any one or more of the components of the system 100 depicted in FIG. 1. For example, one or more steps of the method 300 may be implemented by static-previrtualizer 130 in FIG. 1 (e.g., a server). Alternatively, one or more steps of the method 200 may be implemented by a general purpose computer having a processor, a memory and input/output devices as illustrated below in FIG. 4.

The method 300 begins in step 302 and proceeds to step 310. At step 310, the method receives an untrusted application. For example, the method 300 may receive an untrusted application that a user or resource would like to convert to a trusted executable to be run on server 120 in FIG. 1 (e.g., the target system). For example, in one embodiment the untrusted application may be sent by developer 110 via communication network 101 requesting that the untrusted application be converted to a trusted executable via a static previrtualization process. In another embodiment, developer 110 may first send an untrusted application to server 120. For example, server 120 may be a web-server, or other type of server hosted by an entity unrelated to developer 110. In addition, server 120 may host several applications (e.g., web services) for several developers or other entities. Thus, since server 120 may not develop the actual applications that will be installed and run on the server 120, it may send an untrusted application received from a developer to the static-previrtualizer 130. The foregoing are just two examples of how the method 300 may receive an untrusted application. In one embodiment, the method 300 is performed by a trusted third party, e.g., a party that is unique from both the developer of the application and the target system on which the application will be deployed.

In one embodiment, at step 310 the method 300 may further receive target system parameters which may include various information about the system in which the trusted executable will be run/installed. For example, server 120 may comprise a hardware resource that is shared among various operating systems and applications by means of a hypervisor. Thus, in one example, the target system parameters received by the method 300 may include information about the physical hardware available on the server 120, as well as the hypervisor type(s) (e.g., Xen, Denali, and others) installed on the server. In one embodiment, the target system parameters include an operating system type in which the untrusted application is intended to be run. For instance, if the untrusted application is written for a particular Linux distribution, the target system parameters may include an indication that the untrusted application is designed for the particular Linux distribution. In another embodiment, the target system parameters further comprise a set of operator policies, which will be described in further detail below. For example, the operator of server 120 (e.g., a web-hosting service) may have unique security or operating policies that it would like enforced with respect to the operations and accessing of server 120.

In step 320, the method 300 extracts a system call from the untrusted application. For example, the untrusted application may comprise programming code written in a high level programming language such as Java, C, C++, BASIC, PHP and the like. Further, an untrusted application may make various system calls to an operating system kernel. For instance, the untrusted application may comprise a C program intended to run on Linux. Thus, the programming code contained in the untrusted application may contain various system calls to a Linux kernel, e.g., to interact with device drivers, memory, including read/write operations, and various input output devices, such as a display.

After extracting a system call from the untrusted application at step 320, the method 300 proceeds to step 330 wherein it is determined whether the system call is a privileged system call or a non-privileged system call. In general, a privileged system call is a system call that a user application is trusted to execute and which the user application has permission to invoke directly, e.g., in a user mode. On the other hand, a non-privileged system call is a sensitive operation that a user application does not have authorization to invoke directly. In particular, non-privileged system calls, i.e., sensitive operations, require a switch to a kernel mode of operation, also known as system mode or administrator mode, for execution. In practice, the execution of non-privileged system calls contained in the application code typically causes an interrupt to switch from user mode to kernel mode, through which the kernel operation is executed. When the operation is finished, the mode is switched back to user mode.

Some system calls may be invoked directly from user mode (and do not require a switch to kernel mode), but certain users or classes of users may be alternatively restricted from using or authorized to use such system calls. A restriction or authorization of this nature may be contained in the target system parameters received by the method 300 at step 310. For instance, a table or database may contain lists of access authorizations, privileges and restrictions for various users or classes of users with respect to various system calls and/or groups of system calls. As an example, a memory read operation may customarily be a privileged system call. For instance, an application cannot normally cause a hardware crash by invoking a read operation. However, server 120 may comprise several memory partitions delegated to unrelated guests operating on the server. It may thus be desired to restrict the ability of one guest from accessing the memory space of another guest, even if it is for read-only purposes. Thus, a set of policies received by the method 300 may include a restriction on the read operation. In this case, if the method 300 determines that the memory read operation should be treated as a non-privileged system call. Thus, non-privileged system calls comprise both system calls that can only be invoked in kernel mode and system calls that a user or users are restricted from accessing as indicated by the target system parameters. Privileged system calls therefore comprise all other system calls. In other words, privileged system calls comprise those system calls that may be invoked from user mode and that user(s) are not explicitly restricted from accessing by means of policy (e.g., security restrictions as expressed in the target system parameters received by the method 300 at step 310).

If the system call is determined to be a non-privileged system call at step 330, the method 300 proceeds to step 340. At step 340, the method 300 replaces the non-privileged system call with a library call. For example, in accordance with various embodiments, an untrusted application is received by the method 300 in order to turn the untrusted application into a trusted executable to be run on a server, such as server 120 in FIG. 1. In order to protect the server, non-privileged system calls, (e.g., sensitive commands such as FORK and EXEC in Linux), are replaced with library calls. In particular, the Linux kernel contains a wrapper library with wrapper functions that are library calls that may be invoked by user applications. The wrapper functions then make the actual system calls. Although applications that are intended to be run in user space should not make such direct system calls, an application may still contain direct system calls if the program is intentionally malicious or poorly programmed. Replacing direct system calls with an analogous library call (i.e., a wrapper function) thus removes a point of security vulnerability from the untrusted application. Advantageously, when the modified application is deployed atop a hypervisor (e.g., in server 120 in FIG. 1), the hypervisor will trap the library call and cause the library call to be executed via hardware emulation. In this way, sensitive memory or device operations that would otherwise be triggered by the privileged system call are mimicked by the hypervisor and are not executed on the actual hardware or memory. In contrast, if the privileged system call remained in the application, the system call might bypass the hypervisor and be executed directly by or on the underlying hardware.

On the other hand, if at step 330 the method 300 determines that the system call is a privileged system call, the method proceeds to step 350 where the privileged system call is replaced with a hypercall. Broadly, a hypercall is an invocation of a software resource available in a hypervisor. For example, a hypercall may invoke a device driver that exists in the hypervisor. In practice, the hypercall directly invokes the hypervisor resource and avoids the hypervisor processing trap. This results in a faster executing application. At the same time, the application may be trusted to not harm the host system (e.g., server 120 on which the resulting trusted executable will be installed) because the hypercall only pertains to a privileged system call (e.g., a non-sensitive and/or low-risk operation).

It should be noted that the procedures in steps 340 and 350 require that the method 300 be aware of the intended operating system as well as the hypervisor on which the trusted executable will be run. In addition, the method 300 must have access to the operating system code and the hypervisor code in order to extract library calls (used in step 340) and hypercalls (used in step 350) respectively.

In step 360, the method 300 determines if the untrusted application includes more system calls that have not been subject to the process of steps 320-360. If yes, the method 300 returns to step 320 to extract a system call and repeat the process of steps 320-360 with respect to the next system call. If no, the method proceeds to step 370.

At step 370, the method 300 performs partial evaluation with respect to the operating system and merges operating system resources with the application. Specifically, the method 300 creates a trusted stand-alone executable that can run directly atop a hypervisor by eliminating unnecessary system functions and library functions. In order to create such a trusted stand-alone executable, the method 300 includes code within the trusted executable that comprises all of the operating system kernel resources that are required by the application, but no more. For example, as the method 300 repeats steps 320-360, the method may keep track of all of the library calls that are contained in the application. The method 300 may then include a scaled operating system comprising a minimum of kernel resources, and in particular the functions referenced by the library calls, in the modified application. For instance, if none of the library calls relate to audio resources, any audio drivers or other audio support resources in the operating system kernel are not included/discarded. On the other hand, if the application includes the library call "fork", for example, the method 300 will include the respective kernel code containing the function "fork" in the trusted executable. In other words, the trusted executable is self-contained and includes a stripped down version of an operating system within its own code. Accordingly, when installed, and when the trusted executable makes a library call, the library call will invoke a function that is contained within the trusted executable itself. A separate operating system is not necessary. Furthermore, additional aspects of partial evaluation may be implemented by the method 300 at step 370. For instance, one device driver that exists in the kernel may be able to handle a whole range of different devices, but the application needs it only for one particular context. In this case, the method 300 may modify the driver for only the particular context in which it is needed, and eliminate the unnecessary/redundant components.

In step 380, the method 300 forwards a trusted executable, e.g., to developer 110 in FIG. 1. In particular, after all of the system calls in the untrusted application have been processed via steps 320-360, and partial evaluation is performed with respect to the operating system at step 370, the resulting code comprises a trusted executable that is guaranteed to be secure, portable, self-contained, and well-behaved. The trusted executable may then be deployed, e.g., at server 120 in FIG. 1. In one embodiment, the trusted executable is forwarded to an entity from which the method originally received the untrusted application. For example, if the untrusted application was received from developer 110 in FIG. 1, the method 300 forwards the trusted executable to developer 110. Thereafter, the developer 110 may upload, via communication network 101, the trusted executable to server 120 to be installed. If the untrusted application was received from server 120, the method 300 may forward the trusted executable to server 120. Server 120 may thereafter install and run the trusted executable. At step 395, the method terminates.

In addition, although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application.

Static previrtualization of an application has many advantages. It is easier to develop an assurance case for the software since the host system can be protected from the application software. For example, attacks on a web server hardened through static previrtualization cannot bring down the host. As long as the static previrtualization of the application is certified by a trusted previrtualizer, the application can be trusted to contain only safe invocations of system calls. In addition, since a trusted executable created through static previrualization is previrtualized, in one embodiment it can be deployed in isolation and run in its own runtime environment. Thus, even if the application misbehaves, the previrtualization guarantees that the damage will not leak into anything that violates the target system parameters (e.g., server policies).

In addition to the above, other policies associated with the target system can be enforced through the process of static previrutualization. For example, inlined reference monitors may be inserted into the trusted executable. An example of this technique is provided in "IRM Enforcement of Java Stack Inspection" by Ulfar Erlingsson and Fred B. Schneider, Feb. 19, 2000. Other preventive measures like sandboxing, software fault isolation, stack sentinels, address-space randomization, and system call randomization can also be inserted during the process of static previrtualization. A static previrtualizer can also embed trusted application streaming that can provide just-in-time functionality that is missing from the original version of the application.

Such additional actions may be useful in situations where an application may not be malicious, but operates in a way that is sub-optimal. For example, the application may hold on to memory even after it is no longer needed, and only releases the memory when the application is terminated. A target system parameters may include a policy that memory not being used is released. The static previrtualization process can then incorporate such policy to modify the application such that the trusted executable that is created no longer holds memory unnecessarily.

In one embodiment, in order to provide guarantees that a trusted executable will do no harm, a static previrtualizer may additionally perform malware analysis and system assurance testing using a symbolic analysis tool and constraint solver, such as SAL (Symbolic Analysis Library) and Yices (a SMT (Satisfiability Modulo Theories) solver) respectively.

Furthermore, in one embodiment the process of static previrtualization defines a new standard which requires that a system call table be part of each process's state instead of the global state of the operating system. A new ELF (Executable and Linkable Format) section can be defined in each executable to store the set of system calls a program makes. The cost of this is merely increasing the state size of each process by a few kilobytes: in a world where a typical new computer has multiple gigabytes of random access memory (RAM), this is a worthwhile tradeoff. The key insight is that not worrying about the order of the system calls (in order to reduce mimicry attacks) eliminates the performance impact of runtime monitoring since static previrtualization focuses on intrusion prevention rather than intrusion detection.

In one embodiment, a trusted executable created through the static previrtualization (e.g., via the exemplary method 300) is used to provide a secure web-server application that is constantly running. The application will have access the files it needs, but there is no need to have a user environment running. This provides a level of security to the web-server that did not exist before. In still another embodiment, static previrtualization may be used in deploying a secure virtual private network (VPN). For example, a number of machines running a task can be networked together in a previrtualized type VPN.

Figure 4:
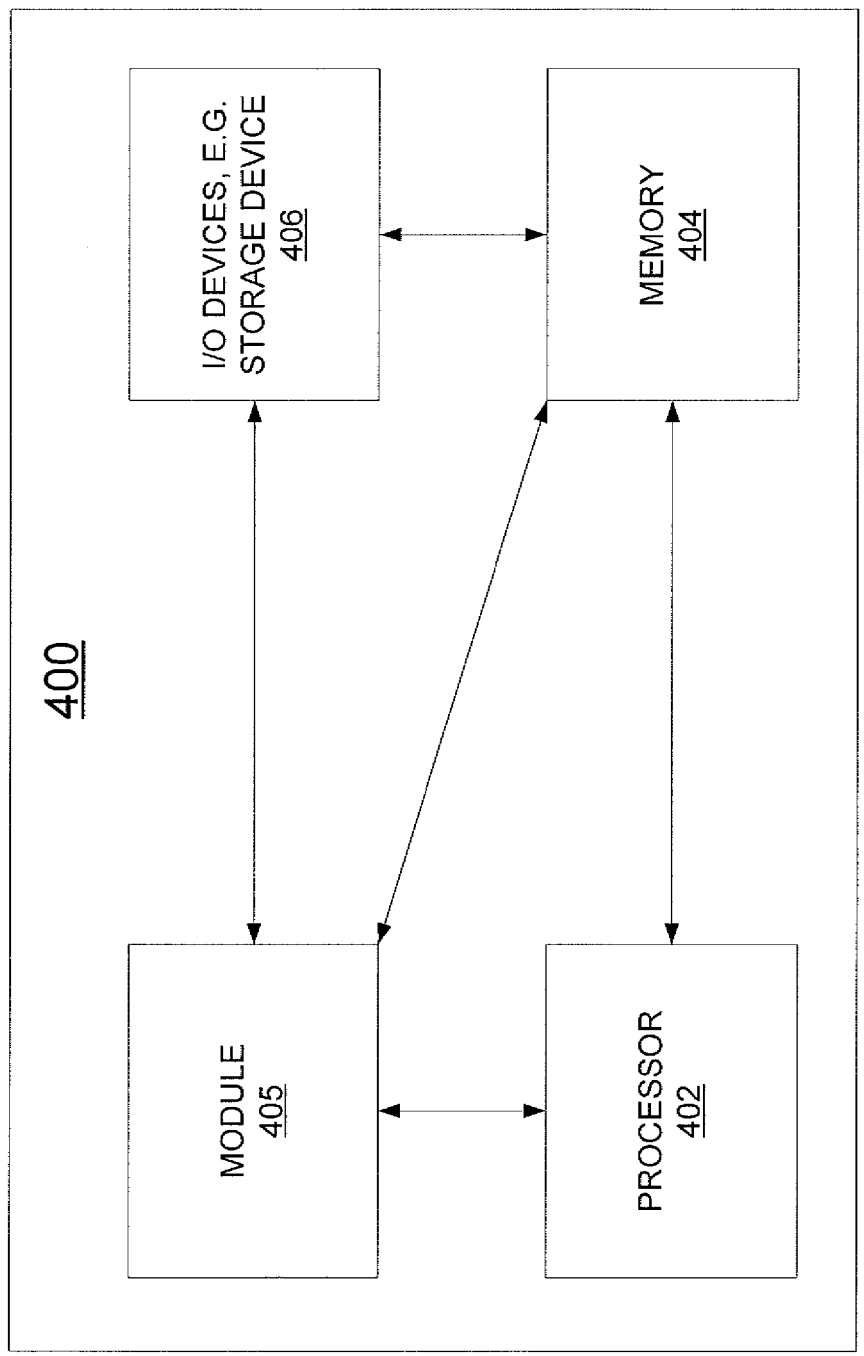
FIG. 4 illustrates a high-level block diagram of a general-purpose computer suitable for use in performing the functions described herein.

FIG. 4 depicts a high-level block diagram of a general-purpose computer suitable for use in performing any and all of the functions described herein (e.g., in connection with the devices and process shown in FIGS. 1-3 and described in the corresponding description). As depicted in FIG. 4, the system 400 comprises a processor element 402 (e.g., a CPU), a memory 404, e.g., random access memory (RAM) and/or read only memory (ROM), a module 405 for transforming untrusted applications into trusted executables through static previrtualization, and various input/output devices 406 (e.g., storage devices, such as computer readable storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 405 for transforming untrusted applications into trusted executables through static previrtualization can be loaded into memory 404 and executed by processor 402 to implement the functions as discussed above. As such, the present module 405 for transforming untrusted applications into trusted executables through static previrtualization (including associated data structures) of the present disclosure can be stored on a non-transitory (tangible or physical) computer readable storage medium, e.g., a computer readable storage device as described above, RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A method for transforming an untrusted application into a trusted executable through static previrtualization, comprising:
receiving the untrusted application;
performing the static previrtualization on the untrusted application to create the trusted executable, wherein the static previrtualization comprises:
replacing a non-privileged system call with a library call; and
replacing a privileged system call with a hypercall;
performing a partial evaluation with respect to an operating system to produce a scaled operating system by eliminating a system function or a library function that is unused by the trusted executable from a kernel of the operating system;
merging the scaled operating system into the trusted executable; and
forwarding the trusted executable for deploying on a target system.

2. The method of claim 1, wherein the receiving the untrusted application further comprises:
receiving at least one target system parameter of the target system.

3. The method of claim 2, wherein the at least one target system parameter specifies a set of privileged system calls and non-privileged system calls.

4. The method of claim 2, wherein the static previrtulization is performed in accordance with the at least one target system parameter.

5. The method of claim 2, wherein the at least one target system parameter specifies one or more security restrictions of the target system.

6. The method of claim 2, wherein the at least one target system parameter comprises an operating system type of the operating system.

7. The method of claim 2, wherein the at least one target system parameter comprises a hypervisor type deployed on the target system.

8. The method of claim 1, wherein the static previrtualization is performed by a server.

9. The method of claim 1, wherein the method is performed by a trusted third party.

10. A computer-readable storage device having stored thereon a plurality of instructions, the plurality of instructions including instructions which, when executed by a processor, cause the processor to perform a method for transforming an untrusted application into a trusted executable through static previrtualization, comprising:
receiving the untrusted application;
performing the static previrtualization on the untrusted application to create the trusted executable, wherein the static previrtualization comprises:

replacing a non-privileged system call with a library call; and replacing a privileged system call with a hypercall;

performing a partial evaluation with respect to an operating system to produce a scaled operating system by eliminating a system function or a library function that is unused by the trusted executable from a kernel of the operating system;

merging the scaled operating system into the trusted executable; and forwarding the trusted executable for deploying on a target system.

11. The computer-readable storage device of claim 10, wherein the receiving the untrusted application further comprises:

receiving at least one target system parameter of the target system.

12. The computer-readable storage device of claim 11, wherein the at least one target system parameter specifies a set of privileged system calls and non-privileged system calls.

13. The computer-readable storage device of claim 11, wherein the static previrtualization is performed in accordance with the at least one target system parameter.

14. The computer-readable storage device of claim 11, wherein the at least one target system parameter specifies one or more security restrictions of the target system.

15. The computer-readable storage device of claim 11, wherein the at least one target system parameter comprises an operating system type of the operating system.

16. The computer-readable storage device of claim 11, wherein the at least one target system parameter comprises a hypervisor type deployed on the target system.

17. The computer-readable storage device of claim 11, wherein the method is performed by a trusted third party.

18. A server for transforming an untrusted application into a trusted executable through static previrtualization, comprising:

a processor configured to:

receive the untrusted application;

perform the static previrtualization on the untrusted application to create the trusted executable, wherein the static previrtualization comprises:

replacing a non-privileged system call with a library call; and replacing a privileged system call with a hypercall;

perform a partial evaluation with respect to an operating system to produce a scaled operating system by eliminating a system function or a library function that is unused by the trusted executable from a kernel of the operating system;

merge the scaled operating system into the trusted executable; and forward the trusted executable for deploying on a target system.

19. The method of claim 1, further comprising:

tracking library calls contained in the trusted executable as the static previrtualization is performed, wherein functions referenced by the library calls are contained within code of the trusted executable.

20. The method of claim 1, wherein the library call is a wrapper function that makes the non-privileged system call.

* * * * *